(No Model.)

J. E. NOHR.
CHURN.

No. 596,082. Patented Dec. 28, 1897.

Witnesses
Geo Wash Young,
N. E. Oliphant

Inventor
J. E. Nohr
By H. G. Underwood
Attorney

THE NORRIS PETERS CO., PHOTO-LITHO., WASHINGTON, D. C.

UNITED STATES PATENT OFFICE.

JOHN E. NOHR, OF MARION, WISCONSIN.

CHURN.

SPECIFICATION forming part of Letters Patent No. 596,082, dated December 28, 1897.

Application filed August 5, 1897. Serial No. 647,153. (No model.)

*To all whom it may concern:*

Be it known that I, JOHN E. NOHR, a citizen of the United States, and a resident of Marion, in the county of Waupaca and State of Wisconsin, have invented certain new and useful Improvements in Churns; and I do hereby declare that the following is a full, clear, and exact description thereof.

My invention has for its object to provide a simple economical churn having an oscillative dasher that may be readily swung up and supported above the vat, so as to be out of the way when butter is being separated from other contents of said vat. Therefore said invention consists in certain peculiarities of construction and combination of parts hereinafter set forth with reference to the accompanying drawings, and subsequently claimed.

Figure 1:
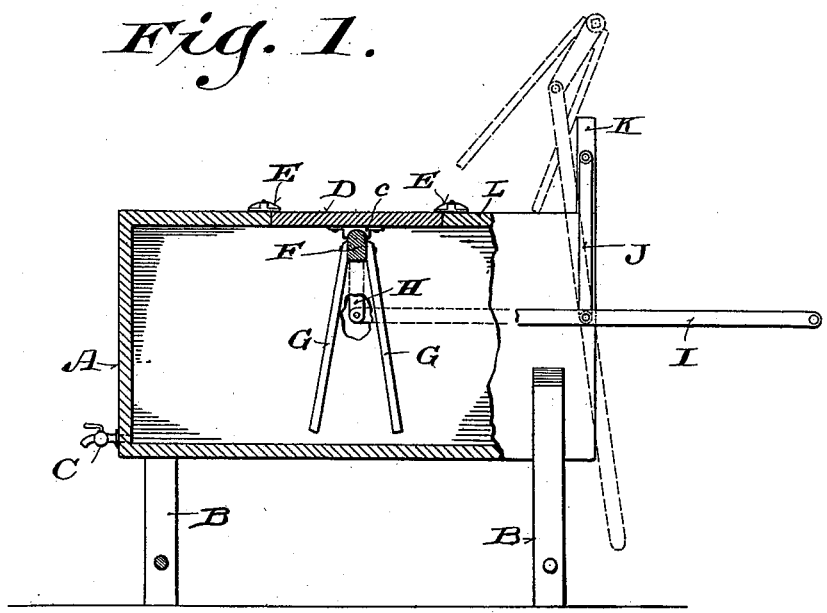
Figure 2:
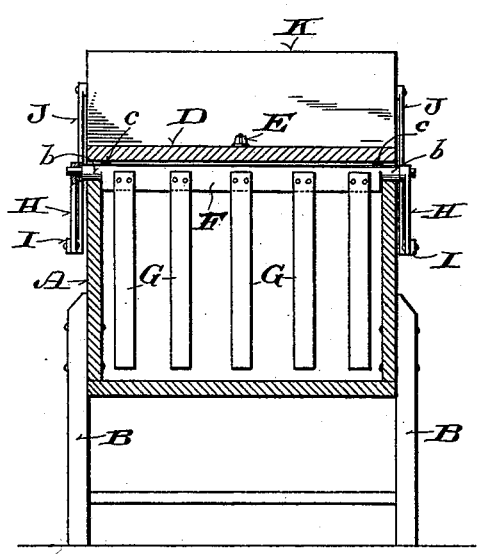

Figure 1 represents a side elevation of a churn constructed according to my invention and partly broken away, the dasher being shown in and out of working position by full and dotted lines. Fig. 2 represents a transverse sectional view of the churn.

Referring by letter to the drawings, A represents the rectangular vat portion of the churn, supported by legs B, made fast thereto and suitably braced. The vat is provided with a drain-faucet C and has the central portion D of its top detachable. Turn-buttons E or other suitable means may be employed to hold the detachable portion of the vat-top in place. Midway of their length the sides of the vat have their upper edges recessed to form bearings for the journals *b* of a transverse bar F, and these journals are held down in their bearings by means of bar-fitting plates *c*, fast on the under side of the detachable top section D of said vat.

Made fast to each side of the bar F are a series of depending and diverging slats G, the latter and said bar constituting the churn-dasher. In rigid connection with the journals *b* of the dasher-bar F, outside the vat, are cranks H, having pivotal connection with ends of a yoke I of suitable length, suspended by links J, in pivotal connection with a riser K at one end of said vat, above a permanent top section L of the same.

By reciprocation of the yoke oscillative motion is imparted to the dasher when the latter is in working position, as shown by full lines in the drawings.

The top section D of the vat being removed, depression of the yoke will operate to swing the dasher out of said vat onto the permanent top section L of the same, as shown by dotted lines in Fig. 1. The dasher being thus positioned butter may be readily separated from the other contents of the vat.

Having thus described my invention, what I claim as new, and desire to secure by Letters Patent, is—

1. A churn comprising a rectangular vat having a detachable central top section, a dasher consisting of a transverse bar having journals engageable with corresponding recesses in upper edges of the vat sides midway the length of the latter and a series of diverging slats depending from each side of said bar; cranks in rigid connection with said journals, a yoke having its ends in pivotal connection with the cranks, a riser at one end of said vat above a permanent top section of the same, and links connecting said yoke and riser.

2. A churn comprising a rectangular vat having a detachable central top section, a dasher consisting of a transverse bar having journals engageable with corresponding recesses in upper edges of the vat sides midway the length of the latter and a series of diverging slats depending from each side of said bar; cranks in rigid connection with said journals, bar-fitting plates on the under side of said detachable top section of the vat, a yoke having its ends in pivotal connection with the cranks, a riser at one end of said vat above a permanent top section of the same, and links connecting said yoke and riser.

In testimony that I claim the foregoing I have hereunto set my hand, at Marion, in the county of Waupaca and State of Wisconsin, in the presence of two witnesses.

JOHN E. NOHR.

Witnesses:
L. J. BINKELMAN,
E. J. MEYER.